United States Patent

[11] 3,634,753

| [72] | Inventor | Robert R. Unterberger<br>Bryan, Tex. |
|---|---|---|
| [21] | Appl. No. | 829,695 |
| [22] | Filed | June 2, 1969 |
| [45] | Patented | Jan. 11, 1972 |
| [73] | Assignee | Chevron Research Company<br>San Francisco, Calif.<br>Continuation-in-part of application Ser. No.<br>626,084, Mar. 27, 1967. This application<br>June 2, 1969, Ser. No. 829,695 |

[54] METHOD OF MAPPING ICE THICKNESS BY FM ELECTROMAGNETIC RADIATION TO INDICATE SHALLOW THICKNESSES THEREOF
4 Claims, 3 Drawing Figs.

[52] U.S. Cl. ..................................................... 324/6,
180/1, 280/1
[51] Int. Cl. ..................................................... G01v 3/12
[50] Field of Search ........................................... 324/4, 6

[56] References Cited
UNITED STATES PATENTS

| 2,657,380 | 10/1953 | Donaldson .................. | 324/6 X |
| 2,659,882 | 11/1953 | Barret ......................... | 324/6 X |
| 3,286,163 | 11/1966 | Holser et al. ................. | 324/6 |
| 3,351,936 | 11/1967 | Feder ........................... | 324/6 X |
| 3,392,384 | 7/1968 | Wesch .......................... | 324/6 X |
| 3,412,321 | 11/1968 | Unterberger et al. ......... | 324/6 |

*Primary Examiner*—Gerard R. Strecker
*Attorneys*—A. L. Snow, F. E. Johnston, R. L. Freeland, Jr. and H. D. Messner ABSTRACT: A method for accurately and quickly mapping from a position immediately forward of a surface traveling vehicle the thickness of ice and variations thereof atop a body of water, as found in winter in the northern United States, Alaska or Canada, by transmitting frequency modulated electromagnetic radiation into the ice, detecting a portion of energy reflected from the remote interface of the ice zone and indicating the two-way travel time of the energy so as to determine ice thickness ahead of the surface vehicle. In this way zones which may not support the surface vehicle can be detected in advance of the motion of the vehicle over these zones and thus avoided. Not only can lives be saved, but equipment loss can be avoided.

PATENTED JAN 11 1972  3,634,753

INVENTOR
ROBERT R. UNTERBERGER
BY Harold D. Messner
George W. Wasson
ATTORNEYS

3,634,753

METHOD OF MAPPING ICE THICKNESS BY FM ELECTROMAGNETIC RADIATION TO INDICATE SHALLOW THICKNESSES THEREOF

CROSS-REFERENCE TO RELATED APPLICATION

This application is a continuation-in-part of Ser. No. 626,084, filed Mar. 27, 1967.

BACKGROUND OF THE INVENTION

The present invention relates to a method of mapping, from a location ahead of intended movement of a surface vehicle, ice thicknesses atop a body of water over an earth formation, as permafrost regions of the world. Permafrost regions are located at the most northerly and southerly extents of the world's land areas and are defined as the perennially frozen layers of earth formation which have remained below zero degrees centigrade for many years Robert F. Black, "Permafrost—A review," Bulletin of G.S.A. 65, 839, 1954).

The present invention relates to a method for accurately and quickly detecting ice thickness atop a body of water from a location immediately ahead of the intended direction of travel of a surface vehicle, say a cleated, tracked vehicle, by transmitting frequency modulated (FM) electromagnetic radiation through the ice, detecting a portion of the energy reflected from the remote interface of the ice water boundary and recording the two-way travel time of the energy so as to detect the thickness of the ice. In that way, the operator of the tracked vehicle can avoid ice zones which have the possibility of not supporting the weight of the vehicle or detect regions of ice thinning in advance.

Among the problems of conducting exploration and oil field producing activities in the permafrost zones of the world, such as Alaska, Canada, Iceland, Greenland, Spitsbergen, Siberia and the Antarctic, is that of transporting men and equipment from a central base location to more remote subsidiary locations as in laying a pipeline or supplying a drilling location by overland tractor train. Although the airplane can provide rapid transportation, it is expensive and affected by weather conditions and so limiting, in fact, that tracked surface vehicles are eventually employed in a large number of these situations. Use of tracked vehicles is usually limited to winter months (during the summer months the upper surface of the permafrost zone, say down to 18 inches, thaws, creating a massive mud layer). During use of winter trails which cross over bodies of water such as lakes or rivers, the vehicle's operators must be careful to avoid travel over shallow ice zones. These zones are ice water areas in which the ice is so shallow that the tracked vehicle may break through the ice into the water.

It is accordingly a particular object of the present invention to provide a novel method of quickly and accurately mapping an ice water interface from the ice surface at a location immediately ahead of the direction of travel of a surface vehicle so that the operator of the vehicle can avoid shallow ice water zones including camouflaged crevasses, fractures, or the like, by transmitting frequency modulated electromagnetic radiation through the ice, detecting a portion of the energy reflected from the remote ice water interface and recording the two-way travel time of the energy reflected from the interface. The operator must have adequate time to stop his vehicle in case shallow ice zones or the like are encountered. Therefore, the generating and receiving electromagnetic antenna may extend several feet or tens of feet in front of the tracked vehicle, say by use of an extension or boom mounted on the vehicle.

SUMMARY OF THE INVENTION

In a preferred form for carrying out the invention, a frequency-modulated electromagnetic radiation and receiving system is located aboard the surface moving vehicle. The radiation and receiving system includes electromagnetic radiating and receiving antenna means mounted on an extended boom forward of the front of the vehicle. Electromagnetic energy is radiated from the antenna in a downward direction toward the ice water contact. A portion of the energy is reflected from this interface and is received at the antenna and detected by the radiation receiving system. Two-way travel time of the energy is interpreted so as to indicate the thickness of the ice zone immediately ahead of the vehicle. In this way the operator can continuously monitor the thickness of the ice so that shallow zones and the possibility of breaking through the ice can be avoided.

The electromagnetic radiation in accordance with the present invention is frequency modulated. Thus, relatively thin ice zones can be determined by the difference in frequency of the emitted and received energy after traversing the ice thickness twice. The frequency of the emitted electromagnetic energy is varied above and below a preselected center frequency at a rate so that the frequency of the returning energy can be compared instantaneously with the frequency presently being transmitted. The frequency difference is interpreted in terms of distance to the bottom of the ice zone. The center frequency is selected to optimize transmission through ice. In this regard, a frequency range from about $10^6$ to $10^{11}$ Hertz has been found to be desirable.

Further objects and advantages of the present invention will be apparent from the following detailed description taken in conjunction with the accompanying drawings which form an integral part of this specification.

Figure 1:
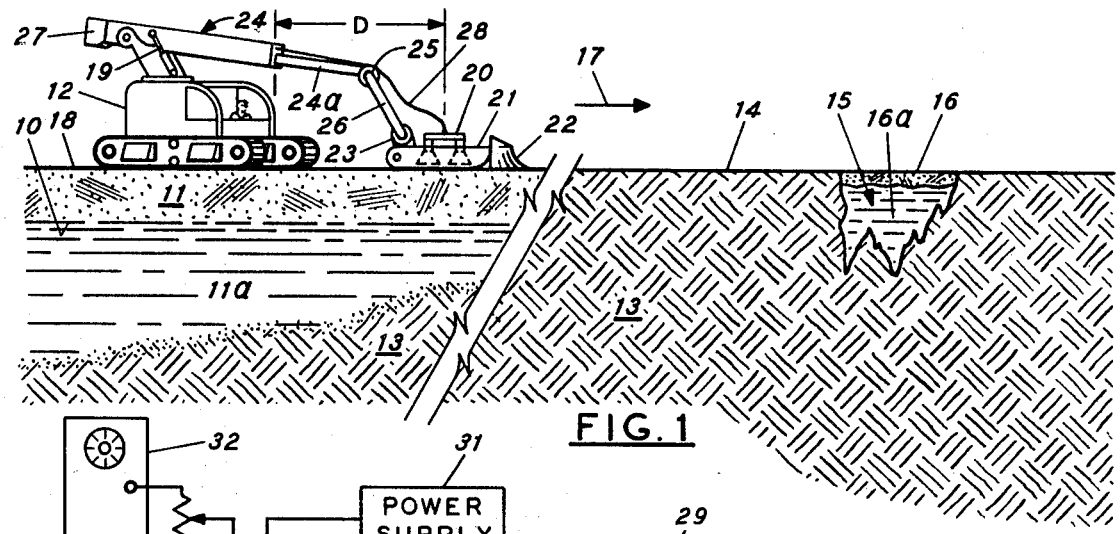
FIG. 1 is a schematic representation of the method of the present invention for accurately and quickly mapping, for an area immediately forward of a surface traveling vehicle, the ice thickness before traveling over that particular section of ice.

Referring now to the drawings and particularly to FIG. 1, there is schematically indicated the method of the present invention to map, by transmitting and receiving frequency-modulated electromagnetic energy, the thickness of ice zone 11 covering a pool of water 11a over an earth formation 13 from a moving search point forward of a surface traveling vehicle 12. The purpose of such mapping is to allow for quick and accurate identification of the condition of the ice zone 11 at a series of surface locations in the direction of intended travel of the surface vehicle 12. In that way, the vehicle's operator can avoid shallow ice zones which could not support the weight of the surface vehicle. For example, 4 feet of good solid ice will support a heavy tractor whereas two feet will not. There is no way, prior to the present invention, of quickly and accurately telling the former thickness from the latter from a moving vehicle. Likewise, where the upper surface 14 of the earth formation 13 (on which the vehicle 12 is traveling; see the right-hand side of FIG. 1, as viewed) abruptly changes so as to form a deep crevasse 15, he can also redirect the tracked vehicle along a new path and avoid breaking through the ice into the crevasse 15 even though the crevasse 15 may be camouflaged by a thin surface of ice 16 over a pool 16a of water. Such events have occurred in the Antarctic and lives of explorers have been lost in this manner.

The ice water contact 10 of the ice zone 11 is not always parallel to the upper surface 18 of the ice zone, however, but may change slope along a given compass direction 17 as shown. Even though the thickness of the ice zone 11 may be more than enough to safely support the weight of the tracked vehicle at one time, it may not be able to do so a short time later, and the tracked vehicle may break through the ice into the pool of water therebelow. Likewise, the upper surface 14 of the earth formation 13 is not always even but may abruptly change so as to form a deep crevasse 15. Where the crevasse 15 is camouflaged by a thin film of ice 16, over a pool of water 16a, the tracked vehicle may break through the ice. Obviously, if the condition of ice zones in the direction of intended travel of the surface vehicle can be continuously monitored (even though the vehicle is undergoing continuous movement across the earth's upper surface), the operator can be constantly aware of the surface condition of the terrain immediately ahead of travel. In that way, he can avoid shallow ice zones, even those over rather small crevasses.

In the system proposed in the aforementioned copending parent application, the distance—depthwise—from an upper surface of the permafrost zone of an earth formation to the remote interface usually is far enough to permit pulse radio frequency energy to be transmitted and adequate time will be available to permit the reception of a reflection of that pulse energy from the remote interface. As the distance to the remote interface becomes smaller and smaller, however (i.e., shallow ice zones are encountered), the use of pulse energy is no longer desirable since the energy will travel to and return from the reflector before transmission of the original pulse can be terminated. Although using separate transmitting and receiving antennas or reducing the pulse width of the emitted energy offers some solution to the problem, resolution of the reflected signals remains a relatively difficult problem of signal interpretation.

Measurements of the condition of an ice layer atop a pool of water can be constantly monitored, in accordance with the present invention, by transmitting frequency-modulated (FM) electromagnetic energy from a generating and receiving antenna array 20 positioned several feet in front of the tracked vehicle 12 in the direction of forward movement, as on a sled 21. Sled 21 can also be rigged with a snow plow 22 at its forward end, and with a mount 23 at its rearward end. Snow plow 22 can be weighted so as to sweep away any snow covering the upper surface of the ice layer so that the antenna array 20 can be placed closely adjacent to the upper surface of the ice layer. Over a central region of the sled, there is provided a floor or deck having apertures (not shown) through which the antenna array 20 extends; the apertures in the deck can be fitted with retaining means to lock the antenna array to the sled. At the rear end of the sled, mount 23 attaches to boom 24 of the tracked vehicle 12, preferably using a universal joint 25 connected to a push bar 26. As indicated, push bar 26 is pivotally mounted to the sled at mount 23. In that way, the sled can accommodate rapid changes in elevation between the sled and vehicle as the vehicle negotiates rugged terrain. Boom 24, in turn, is mounted at base 27 to the tracked vehicle 12. In operation, energy is transferred from energization equipment interior of the vehicle 12 through a cable assembly 28 to the antenna array 20 for transmission into the ice layer. A portion of the energy reflected from the remote interface 10 of the ice layer is detected and then displayed by means of a display system within the tracked vehicle 12. By measuring the two-way travel time of the energy, such as by analyzing the difference in frequency between the emitted and received energy, the thickness of the ice can be instantaneously indicated and displayed. A knowledge of the average dielectric constants of the ice and possibly of air (depending on just how high the antenna array 20 is positioned above the surface 18 of the formation 11; usually the distance is inconsequential in the present invention since the antenna array is positioned closely adjacent to the surface 18, even being in direct contact therewith as through an ice coupler means (not shown) packed within the horns of the array 20 and slidable over the surface 18) is required to interpret the travel time of the emitted and reflected energy in terms of distance.

Figure 2:
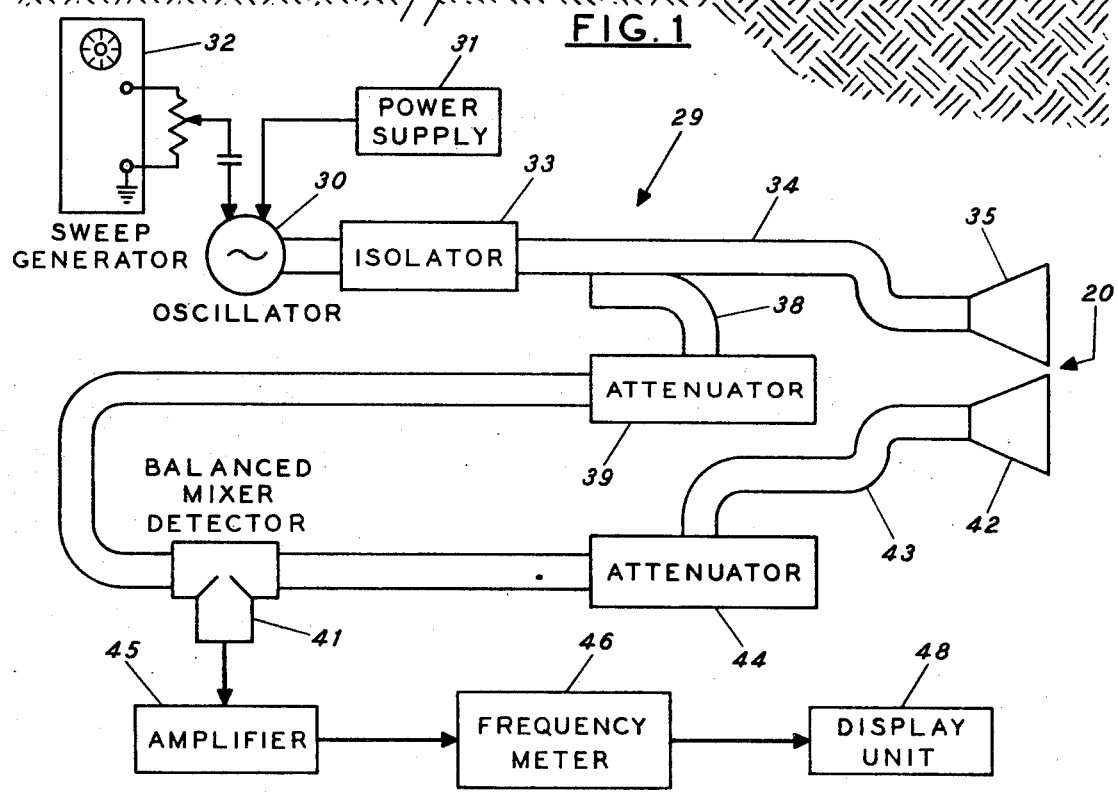
FIG. 2 illustrates, in block diagram form, the electromagnetic generating, receiving and display means useful in the arrangement of FIG. 1.

Referring now to FIG. 2, there is illustrated electromagnetic transmitting and receiving circuit 29 for transmitting and receiving continuous wave frequency-modulated electromagnetic energy. As shown, continuous wave oscillator 30 is energized by power supply 31 to generate a basic frequency ($f_o$) for the radiating electromagnetic energy. Preferably the basic frequency ($f_o$) is equal to a frequency within a range of $10^8$ to $10^{11}$ Hertz. The oscillator 30 may be a vacuum tube, a magnetron, or a klystron capable of operating at the desired frequencies of transmission and at a suitable power output. A sweep generator 32 modulates the oscillator by generating a varying potential at a frequency ($f_m$), say from $10^6$ to $10^{11}$ Hertz, to cause a preferably linear time variation in the transmitted frequency about the oscillator center frequency ($f_o$). The output of the oscillator is applied through an isolator 33 to a transmission line 34 carrying the electromagnetic energy to a transmitting antenna 35 of antenna array 20. Transmitting antenna 35 is preferably the directional type, mounted, as previously discussed, on a boom on the surface vehicle. (Such antenna may or may not be in contact with the ice whose thickness is being measured, as previously mentioned.) The antenna 35 is oriented to direct the energy downward into the ice layer. Between isolator 33 and the transmitting antenna 35 is a directional coupler 38 for sampling the frequency of the oscillator 30. The sample signal is supplied through attenuator 39 to a balanced mixer-detector 41. In carrying out the invention in accordance with the present embodiment, receiving antenna 42 of the antenna array 20 is located adjacent to transmitting antenna 35. It connects through transmission line 43 to an attenuator 44 and thence to a second input to balanced mixer-detector 41. At the balanced mixer 41 the outputs of attenuators 39 and 44 are mixed to develop a difference frequency. In FIG. 2, the direction of energy flow in the waveguide is shown by arrows. The waveguide could be replaced by coaxial lines, however. This difference frequency is fed to amplifier 45. A frequency meter 46 measures the frequencies of the difference signals from the balanced mixer-detector 41 and then feeds the information to display unit 48.

Figure 3:
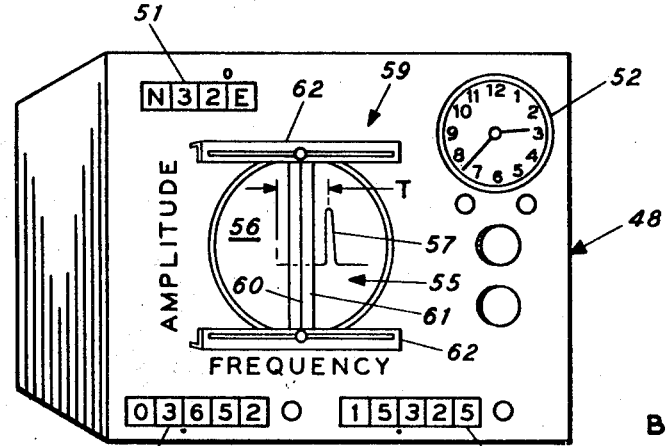
FIG. 3 illustrates, in more detail, the display unit of the electromagnetic generating, receiving and display means of FIG. 2.

FIG. 3 illustrates display unit 48 in more detail. Display unit 48 includes several indicators: for compass heading, 51; for time, clock 52; for geographic location of the vehicle, Shoran indicators 53 and 54 in thousandths of a mile; and for display of the two-way travel time (T) of the electromagnetic radiation, oscilloscope 55. As thin or shallow ice zones represent dangerous conditions to all surface traveling vehicles, the geographic position of the vehicle should be known as shallow ice zones are encountered. Provided for this purpose are the distance indicators 53 and 54 that are part of an electronic position-locating system such as Shoran. These indicators digitally display distance to the two known locations of the Shoran transmitters. From these units, the position of the the vehicle can be determined at any time. The compass heading indicator 51 also provides useful information.

In carrying out the present invention, the remote contact or interface of the ice layer is indicated by measuring the two-way travel time (T) of the electromagnetic energy. Within display unit 48, oscilloscope 55 measures and displays the two-way travel time (T) in the following manner.

Display face 56 of the oscilloscope 55 shows one reflected signal. The signal 57 represents a reflection from the remote ice water interface. Note that the amplitude of signal 57 is relatively large because of the large change in relative dielectric constant occurring at the ice water interface characteristic of the remote interface of the ice layer. The relationship of the difference in frequency to the distance, depthwise, from the upper surface of the ice layer to its remote interface is found in the following equation:

Difference in rate of change of the frequency = changing frequency $\times$ time between reflections from the upper and lower interfaces of the ice layer $$\Delta f = R_t \times T$$

which can be written as:

$$\Delta f = \frac{B}{\frac{1}{2f_m}} \times \frac{2d}{v}$$

where $f_m$ = Modulation rate in Hertz

B = Band width of the frequency modulation in Hertz $d$ = Distance from the ice-air interface to the ice-water interface of the ice layer $v$ = The velocity of transmission in the ice layer which, for measurement purposes, is equal to:

$$v = c \Big/ \sqrt{\frac{E'}{E_0}}$$

in meters/second, where $c$ = Speed of light in air in meters/second $E'$ = The real part of the complex dielectric constant of the ice layer at the center frequency in farads/meter $E_0$ = The real part of the complex dielectric constant of free space = $\frac{1}{36\pi} \times 10^{-9}$ farads/meter Thus we obtain $$\Delta f = \left[\frac{4 f_m B \sqrt{E'/E_0}}{c}\right] d$$

$$\Delta f = Kd$$

where K is a constant representing the system parameters in the bracket. Thus we can relate $d$, the ice thickness, to the frequency difference $\Delta f$ detected by the mixer 41 and displayed by the display unit.

By associating the two-way travel time presented by the frequency difference of the emitted and received energy with the other information presented on the remaining indicators on display unit 48, the thickness of the ice layer immediately ahead of the surface vehicle at the antenna array 20 can be indicated as a function of the instantaneous geographical location of the vehicle. Previously, the operator could have estimated by mathematical calculation, the "minimum" thickness of ice which is capable of holding the weight of his vehicle. Using the "estimated" $\Delta f$ from the equation $\Delta f = Kd$ and knowing the value of K (estimated from a knowledge of the travel of energy in ice of the particular zone), he can place on the face 56 of the oscilloscope 55 a threshold indicator 59 including stripline 60 parallel to the vertical axis of the oscilloscope which indicates the "minimum" ice layer, for example 3 feet, over which the tracked vehicle can travel. Stripline 60 is preferably mounted on a transparent support 61 slidably connected to runners 62. Thus an operator, constantly monitoring the display, is quickly aware of the fact that immediately ahead, "shallow" ice layers exist and can redirect the direction of the vehicle to avoid such conditions.

It is also evident that ice thickness measurements can occur even when the tracked vehicle is undergoing movement at a relatively constant velocity over the ice zone ("dynamic condition"). Further, he can adjust threshold indicator 59 as conditions change. Further, he can increase near-range resolution of the system simply by increasing the rate of change of the changing frequency of the generated energy, i.e., by increasing the rate of change of the changing frequency ($R_f$) in the above-identified formula. The changing frequency ($R_f$) can be increased by increasing the bandwidth (B). It has been found that if the rate of change of the changing frequency ($R_f$) is equal to a value between $10^6$ to $10^{11}$ Hertz, then the system of the present invention can be used to detect ice thicknesses from a few inches to 10 feet.

In carrying out the method of the present invention, it is assumed that the thickness of the ice zones of interest will be relatively shallow. Accordingly, in such cases frequency-modulated (FM) ranging systems are proposed to be employed to measure these relatively small thicknesses.

Of importance in the practice of the present invention in the dynamic condition is the position of the antenna array 20 relative to the forward portion of the tracked vehicle undergoing movement, at a relatively constant velocity, over the upper surface of the ice zone.

Referring again to FIG. 1, it is seen that the distance D indicates the horizontal spacing separating antenna array 20 from forward cab of the vehicle 12. The magnitude of the spacing, in the direction of travel of the vehicle, should be sufficient to allow the operator (even though proceeding at a given velocity V across the upper surface 14 of the ice zone) to be able to stop his vehicle should he determine that the area he is approaching is not sufficient to support the weight of his vehicle. Accordingly, the velocity V of the vehicle under such conditions as well as the average reaction time of the operator in bringing his vehicle to a safe stop after he has been made aware of an unsafe ice condition, determine the minimum distance D separating the cab of the vehicle from the antenna array 20. Thus, assuming that a vehicle is moving at an average velocity V across the surface of the earth, and the time for the operator to both sense the indication of an unsafe ice layer condition in the path of his vehicle and to bring his vehicle to a stop is $T_o$, then the distance D that the antenna array must extend forward of the tracked vehicle must be at least $$D = VT_o$$

If the velocity of the vehicle is approximately 10 miles per hour and the time needed for the operator to bring his vehicle to a stop is 2½ seconds (after an unsafe surface condition has been indicated by the system of the present invention), the least distance that the antenna array 20 should extend in the direction of travel of the vehicle would be 37 feet. It should be noted that antenna array 20 is positioned forward of the cab of the vehicle by means of telescoping extension 24a of boom 24. Further, the length of extension 24a can be varied as (in accordance with above equation) by means of a piston driving means (not shown) interior of the base 27 at the rear of the boom 24. It should be noted that the time required to generate and receive frequency modulated energy is so minute compared with the time required for the operator to react that such value does not enter into the determination of the minimum distance D in the above equation.

Boom 24 can be pivotally mounted, by base 27, to the vehicle 12 as shown in FIG. 1. Accordingly, the horizontal position of the antenna array 20 can be varied with respect to the upper surface of the ice zone by releasing the array from the sled 22, changing the horizontal position of the array from then relocking the array to the sled. A piston means 19 is seen in FIG. 1 as being adjustably attached between base 27 and the rear of the cab of the vehicle and can be used to aid in any readjustment of the array.

It should be noted that low attenuation of the electromagnetic waves propagating in the ice layer is possible by the immobilization of the water molecules. The electric dipole moment of the water thus cannot respond to the time-varying electric vector of the propagating wave.

While certain preferred embodiments of the invention have been specifically disclosed, it should be understood that the invention is not limited thereto as many variations will be readily apparent to those skilled in the art, and the invention is to be given its broadest possible interpretation within the terms of the following claims.

I claim:

1. Method of dynamically measuring the thickness of ice layers covering a river or a lake in order to determine whether such ice thickness is capable of supporting a continuously moving surface traveling vehicle traversing the upper surface of said ice layer which comprises the steps of:

a. positioning an antenna array at a position forward of said continuously moving surface traversing vehicle in the direction of intended travel but closely adjacent to the upper surface of said ice layer, b. radiating, from said position, into said ice layer continuous wave, frequency-modulated electromagnetic energy over a certain frequency range within $10^6$ to $10^{11}$ Hertz, c. detecting reflections of said energy from, at least, the bottom of said ice layer, said bottom forming an electromagnetic discontinuity between said ice and said liquid water lying therebelow, said energy being detected by means of said receiving antenna array of said vehicle, d. indicating said reflections from the bottom of the ice, said reflections representing the distance to said ice bottom from said transmitting antenna as measured by the two-way travel time of said energy and interpretable in terms of frequency difference, and e. substantially simultaneous with the in-order occurrence of steps (b)–(d), comparing said frequency difference of said reflected energy with a threshold indication level equivalent to an ice layer thickness which is sufficient to safely support the weight of said vehicle so as to thereby allow determination of whether or not said vehicle can proceed, in safety, along said intended direction of travel.

2. Method in accordance with claim 1 in which step (e) occurring substantially simultaneous with steps (b)–(d) is further characterized by a maximum time increment, $T_o$, equal to $D/V$ where $T_o$ further includes the time required to bring said vehicle to stop after said depth of said ice layer has been indicated, compared and displayed, $D$ is the distance that the antenna array is positioned forward of said surface traversing vehicle measured along the intended time of travel of said vehicle from the forward section of said vehicle and $V$ is the velocity of said vehicle as said ice thickness is instantaneously mapped.

3. Method in accordance with claim 1 with the additional step of redirecting the direction of travel of said vehicle after said reflected energy has been compared with said threshold indication level and has been found to indicate that said monitored ice layer is not sufficient, depthwise, to safely support the weight of said vehicle.

4. Method of dynamically measuring the thickness of ice layers covering a river or a lake in order to determine whether such ice thickness is capable of supporting a continuously moving surface traveling vehicle traversing the upper surface of said ice layer which comprises the steps of:

a. positioning an antenna array at a position closely adjacent to the upper surface of said ice layer along the intended direction of travel of said continuously moving surface traveling vehicle, b. radiating, from said position, into said ice layer, continuous wave frequency modulated electromagnetic energy over a certain frequency range within $10^6$ to $10^{11}$ Hertz, c. detecting reflections of said energy from, at least, the bottom of said ice layer, said bottom forming an electromagnetic discontinuity between said ice and said liquid water laying therebelow, said energy being detected by means of said antenna array, d. indicating said reflections from the bottom of the ice, said reflections representing the distance to said ice bottom from said transmitting antenna as measured by the two-way travel time of said energy and interpretable in terms of frequency difference, and e. substantially simultaneous with the in-order occurrence of steps (b)–(d), comparing said frequency difference of said reflected energy with a threshold indication level equivalent to an ice layer thickness which is sufficient to safely support the weight of said vehicle so as to thereby determine whether or not said vehicle can proceed, in safety, along said intended direction of travel.

* * * * *